United States Patent [19]
Geshi

[11] Patent Number: 6,076,833
[45] Date of Patent: Jun. 20, 2000

[54] METAL GASKET

[75] Inventor: Kazuyuki Geshi, Osaka, Japan

[73] Assignee: Nippon Gasket Co., Ltd., Osaka, Japan

[21] Appl. No.: 09/099,380

[22] Filed: Jun. 18, 1998

[30] Foreign Application Priority Data

Jul. 18, 1997 [JP] Japan .................................. 9-208314

[51] Int. Cl.⁷ .................................................. F02F 11/00
[52] U.S. Cl. ........................... 277/595; 277/593; 277/594; 277/598
[58] Field of Search ..................... 277/591, 592, 277/593, 594, 595, 598

[56] References Cited

U.S. PATENT DOCUMENTS

| | | | |
|---|---|---|---|
| 1,472,133 | 10/1923 | Oven | 277/598 |
| 4,759,585 | 7/1988 | Udagawa | 277/595 |
| 5,092,613 | 3/1992 | Udagawa | 277/595 |
| 5,382,029 | 1/1995 | Udagawa et al. | 277/591 |
| 5,513,855 | 5/1996 | Yasui | 277/591 X |
| 5,516,120 | 5/1996 | Damusis | 277/594 |
| 5,522,604 | 6/1996 | Weiss et al. | 277/595 |
| 5,532,051 | 7/1996 | Nishiura et al. | 428/217 |
| 5,536,024 | 7/1996 | Udagawa | 277/595 |
| 5,588,657 | 12/1996 | Fujisawa et al. | 277/595 |
| 5,685,547 | 11/1997 | Jargeaix | 277/594 |
| 5,713,580 | 2/1998 | Ueta | 277/595 |

FOREIGN PATENT DOCUMENTS

| | | |
|---|---|---|
| 5-39868 | 2/1993 | Japan . |
| 7-243531 | 11/1995 | Japan . |

*Primary Examiner*—Anthony Knight
*Assistant Examiner*—Alison K. Pickard
*Attorney, Agent, or Firm*—Browdy and Neimark

[57] ABSTRACT

This metal gasket comprises a pair of beaded metal plates formed of elastic metal plates having beads extending along the circumferences of bore holes, and adapted to seal bore seal portions, and one outer circumferential metal plate formed of an elastic metal plate adapted to seal outer circumferential seal portions other than the bore seal portions. The beaded metal plates and outer circumferential metal plate have different sealing performance, and are adapted to seal the bore seal portions and outer circumferential seal portions respectively, these two types of metal plates being formed out of different materials, whereby the gasket manufacturing cost is reduced. A pair of beaded metal plates are provided with beads extending along the circumferences of the bore holes with the projecting portions thereof opposed to each other. Since the thickness of the single outer circumferential metal plate is set larger than that of each of the beaded metal plate and smaller than a total thickness of the two beaded metal plates, the surface pressure of the bore hole-surrounding regions can be set high.

15 Claims, 5 Drawing Sheets

METAL GASKET

BACKGROUND OF THE INVENTION

1. Field of the Invention

This invention relates to a metal gasket for sealing a clearance between the opposed surfaces of parts of an engine, especially a multicylinder engine.

2. Description of the Invention

A metal gasket has been used to seal a clearance between the opposed surfaces of structural parts of an engine, such as a cylinder head and a cylinder block. A metal gasket has beads at the portions thereof which are in the vicinity of its through holes made correspondingly to combustion chambers, water passages and oil passages. When the metal gasket is inserted between a cylinder head and a cylinder block and tightened with bolts and thereby fixed, the beads form annular, elastic contact portions with respect to the opposed fixing surfaces and work so as to seal the clearance between the same opposed fixing surfaces.

A recent engine requires a higher output and smaller weight. There is a tendency for a cylinder head to be manufactured out of an aluminum material of a low specific gravity instead of a conventional material of a high specific gravity, such as steel and a cast iron for the purpose of meeting the demand. An aluminum material has small weight but does not a high rigidity, so that the relative displacement of a cylinder head with respect to a cylinder block comprising steel or a cast iron tends to increase during an operation of an engine. The tightening bolts for tightening the opposed fixing surfaces of these structural members of different materials via a single-plate metal gasket are set in a scattered manner wholly in an outer circumferential portion of the metal gasket or comparatively overwhelmingly in an outer circumferential portion thereof. Namely, the tightening bolts are not always distributed uniformly around the bore holes, so that the opposed fixing surfaces are liable to become irregular. Consequently, a high-temperature high-pressure combustion gas enters the portions, which are greatly distorted, of the opposed fixing surfaces which are among the bore holes to cause the beads of the metal gasket interposed between the opposed fixing surfaces to be corroded and polluted, and the sealing effect of the metal gasket to decrease.

When a cylinder head gasket is used, the distance between a cylinder head and a cylinder block increases and decreases repeatedly during a combustion cycle of an engine, and repeated stress (mechanical stress and thermal stress) is exerted on the metal gasket as well. The load fluctuation stress against the metal gasket occurs at the highest level in the portion thereof which corresponds to the portions of the lowest rigidity of the cylinder block and cylinder head. As a result, permanent set in fatigue and cracks occur in the beads formed on the metal gasket, to cause the sealing performance of the metal gasket to be deteriorated.

The applicant of the present invention developed the metal gasket shown in FIGS. 8, 9 and 10, and filed previously (Japanese Patent Laid-Open No. 39868/1993). FIG. 8 shows a metal gasket having a structure in which a pair of elastic metal plates 21, 28 are laminated, the boundary portions of adjacent bore holes 22A, 22B; 29A, 29B formed in these elastic metal plates 21, 28 being shown in section along the center line connecting the centers of the same bore holes 22A, 22B; 29A, 29B together. Around the bore holes 22A, 22B of the elastic metal plate 21, a bead 24 projecting toward the elastic metal plate 28 is formed annularly, and, around the bore holes 29A, 29B of the elastic metal plate 28, a bead 30 projecting toward the elastic metal plate 21 is formed annularly. The bead 24 of the elastic metal plate 21 and that 30 of the elastic metal plate 28 are provided so as to contact each other. The beads 24, 30 may be formed so as to be aligned with each other as shown in the drawing or staggered from each other between bore holes 22A and 22B and between bore holes 29A and 29B. Around the bore holes 22A, 22B of the elastic metal plate 21, folded portions 25A, 25B folded back toward the elastic metal plate 28 are formed.

In the above-described metal gasket, a double seal portion is secured in the bead and folded portions around the bore holes, so that, even when irregularity occurs on the opposed fixing surfaces of two structural parts during a gasket tightening operation, the bead and folded portions are deformed correspondingly to the distorsion of these fixing surfaces to offset the irregularity of the same surfaces. Since the forming of such folded portions as mentioned above is restricted by the hardness, extensibility, strength and thickness of the elastic metal plate, it is necessary that a plate material having comparative-low hardness and strength, a small thickness and a high extensibility be used. When a metal gasket formed out of such a material is used for a long period of time, permanent set in fatigue and cracks become liable to occur in the bead. Moreover, the folded portions formed on a metal gasket make the thickness of the gasket increase around the bore holes. Therefore, when the metal gasket is held between the opposed fixing surfaces and tightened, the surface pressure is more easily concentrated on the bore hole-surrounding portions than on the other portions of the elastic metal plates. When the engine parts are formed out of aluminum, impressions become liable to occur in the opposed fixing surfaces.

The metal gasket shown in FIG. 9 differs from that shown in FIG. 8 in that the thickness of an elastic metal plate 31 is set equal to that of an elastic metal plate 38.

The metal gasket shown in FIG. 10 differs from that shown in FIG. 8 in that soft metal plates 27A, 27B are embraced in folded portions 25A, 25B of an elastic metal plate 21 so as to regulate the thickness of the portions of the metal gasket which are around the bore holes 22A, 22B. When the thickness of the portions of the metal gasket which are around the bore holes 22A, 22B is increased, the sealing performance of the metal gasket held between the opposed fixing surfaces and tightened can be improved with respect to the leakage of a gas from the portions of the same surfaces which are around the bore holes 22A, 29A; 22B, 29B.

Japanese Patent Laid-Open No. 243531/1995 discloses the scalability of the circumfenential edge portions of the bore holes of a metal gasket. In this metal gasket, opening edge-applying metal plates for surrounding at their regions of a suitable width the circumferential edge portions of cylinder-aligned openings equivalent to bore holes, and a metal plate joined to the circumferences of the opening edge-applying metal plates, and having a thickness smaller than that of the opening edge-applying metal plates constitutes an auxiliary plate. This metal gasket is formed by laminating this auxiliary plate between two base plates having beads projecting toward the cylinder-aligned openings of the other base plates, in such a manner that the beads contact the opening edge-applying metal plates.

In general, due to the reduction of the weight of a recent engine, the distance between adjacent bore holes tends to decrease, so that the regions between adjacent bore holes are exposed to a high-temperature combustion gas to cause the gas to become liable to leak. Therefore, in order to secure the sealing performance among the bore holes, expensive elastic metal plates are used for the production of a metal gasket. In the metal gasket disclosed in this publication, an expensive elastic metal plate is used by extending itself over the whole opposed fixing surfaces so as to seal the holes which are other than the bore holes, and which do not require high-degree sealing performance of the metal gasket. Therefore, the metal gas-manufacturing cost becomes high.

SUMMARY OF THE INVENTION

An object of the present invention is to provide a metal gasket wherein bore seal portion-sealing beaded metal plates provided with beads around the bore holes formed correspondingly to combustion chamber-forming bores, so as to seal the regions around the bores, and an outer circumferential metal plate for sealing outer circumferential seal portions around holes, such as bolt holes, water holes, oil holes and knock holes which are other than the bore holes, the beaded metal plates and outer circumferential metal plates being formed of different kinds of elastic metal plates, the beaded metal plates which require high-degree sealing performance, and which are adapted to seal the bore hole-surrounding regions, being formed out of an expensive metal material so as to secure the sealing performance reliably, the outer circumferential metal plate disposed in regions which do not require such a high sealing performance as the bore hole-surrounding regions being formed out of an inexpensive metal material, the beaded metal plates and outer circumferential metal plate being formed so that they can be joined together simply in a mutually sealed condition when the gasket is held between the opposed fixing surfaces and tightened, whereby it becomes possible to reduce the cost and secure a proper sealing performance by giving consideration to the thickness of the metal plates.

The present invention relates to a metal gasket comprising a pair of beaded metal plates which are provided with parallel-arranged bore holes and beads extending along the circumferences of the bore holes, and which are adapted to seal the regions around the bore holes, and an outer circumferential metal plate which is provided with an opening extending along a portion thereof corresponding to the circumferential edge portions of the beaded metal plates, and holes other than the bore holes with an edge portion of the opening disposed between the beaded metal plates, and which is adapted to seal an outer circumferential region other than the bore hole-surrounding regions, the projecting portions of the beads of the beaded plates being opposed to each other, the thickness of the outer circumferential plate being set larger than that of each of the beaded metal plates and smaller than a total thickness of the beaded metal plates.

In this metal gasket, the sealing of the bore hole-surrounding regions to be sealed and the outer circumferential region to be sealed which is distant from the bore holes is done in a divided manner by different elastic metal plates. The two beaded metal plates the projecting portions of the beads of which are opposed to each other take charge of sealing the regions of bore sealing portions around the parallel-arranged bore holes. The outer circumferential metal plate disposed and simply connected between the circumferential edge portions of the two beaded metal plates takes charge of sealing the regions of the outer circumferential sealing portions around holes other than the bore holes, such as water holes and oil holes.

When this metal gasket is inserted between the opposed fixing surfaces of parts, such as a cylinder head and a cylinder block of an engine and tightened, a specially large tightening force is applied to the beads of the beaded metal plates since the total thickness of the beaded metal plates is set larger than the thickness of the outer circumferential metal plate. Accordingly, even when irregularity occurs on the opposed fixing surfaces when the metal gasket is tightened therebetween, the beaded metal plates can offset the distorsion of the same surfaces. During this plate tightening operation, the beads, the projection portions of which are opposed to each other, of the beaded metal plates are deformed, and contact the opposed fixing surfaces at both the inner and outer circumferential edge portions of the former. Consequently, each bead forms two seal lines around the bore holes with respect to the opposed fixing surfaces, i.e., a doubly sealed condition is created. A sufficient tightening force for sealing the regions around the holes other than the bore holes is applied to the outer circumferential metal plate.

The thickness of the beaded metal plates is set to the same or different levels. The thickness of the beaded metal plates can be set suitably in accordance with the condition of the opposed fixing surfaces. Regarding the beaded metal plate to be disposed on the side on which the irregularity of the opposed fixing surfaces is expected to occur more greatly, the thickness thereof is set larger in advance.

The height of the beads is set to the same or different levels. When the height of the beads of the beaded metal plates is varied, a deformation amount of the beaded metal plates varies when the metal gasket is inserted between the opposed fixing surfaces and tightened. Therefore, when the degree of irregularity of the opposed fixing surfaces of parts varies, the height of the beads of the beaded metal plates can be varied just as the thickness of the beaded metal plates so as to prevent the occurrence of inconveniences.

The beads formed on the beaded metal plates comprise full beads. When the beads comprise full beads, the edge portions on both sides of each full bead the projecting portion of which is opposed to that of the corresponding full bead of the opposed beaded metal plate contact the opposed fixing surfaces when the metal gasket is held between the same surfaces and tightened, two forcibly pressed seal lines are formed. Accordingly, beads comprising full beads enable a high sealing performance to be secured around the bore holes.

In the regions around the opening of the outer circumferential metal plate and around the holes thereof other than the bore holes, the sealing performance the degree of which is as high as that of the sealing performance of the regions around the bore holes of the beaded metal plates is not required. Accordingly, the sealing requirements for these regions can be met by obtaining a sealing force by generating flexure in the half beads formed on the outer circumferential metal plate.

The beads of the beaded metal plates meet between adjacent bore holes, or separate from each other. Between adjacent bore holes, the beads are formed so as to meet each other or separate from each other with the smallest width of a region between the bore holes, the shape of the beads including the height and which thereof, and a required degree of sealing performance taken into consideration. When the beads are provided separately, a total of four seal lines which generate a sealing performance are formed between adjacent bore holes since each bead forms seal lines at the edges on both sides of the projecting portions thereof. Therefore, a large sealing force can be obtained in the regions, which demand the highest sealing performance, between adjacent bore holes.

The outer circumferential metal plate is partially fixed to at least one of the beaded metal plates. The beaded metal plates and outer circumferential metal plate are tightened by tightening bolts after these plates have been held between the opposed fixing surfaces. Therefore, it is unnecessary that the gasket itself, i.e. the members thereof be fixed to each other firmly. However, it is preferable to fix the members of the gasket together to such an extent that they are not easily separated, and in such a manner that the handling of the gasket as a single article including the storing, transferring and assembling of the same can be done easily.

Some of the holes other than the bore holes are formed by recesses provided in either the circumferential edges of the two beaded metal plates or the opening of the outer circumferential metal plate or both. For example, when the contours of the beaded metal plates and outer circumferential metal plate are formed by punching metal plates, recesses are formed as parts of the contours of at least one kind of metal plate out of these metal plates. The holes, such as water holes other than the bore holes are formed by these recesses by merely combining the beaded metal plates and outer circumferential plate with each other.

This metal gasket is formed as described above. Accordingly, when the metal gasket is inserted between the opposed fixing surfaces and tightened, the beads the projecting portions of which are opposed to each other form double annular seal portions against the opposed fixing surfaces at both side edges of the beads. Owing to these concentric multi-ring type seal portions, the leakage of a high temperature high-pressure combustion gas from the bore holes to both of the opposed fixing surfaces can be prevented. A total thickness of the portions of the beaded metal plates which are positioned around the bore holes is set larger than the thickness of the outer circumferential metal plate in the region away from the bore holes, so that a proper sealing function of the metal gasket can be secured in the bore hole-surrounding regions which demands this sealing function most.

Since the bore hole-surrounding regions of the beaded metal plates are influenced by the high-temperature corrosive combustion gas, a high-grade metal material of high heat resistance and high corrosion resistance is used. The outer circumferential seal portions sealing the regions around the holes of the outer circumferential metal plate encounter a low environmental severity as compared with the bore seal portions sealing the bore hole-surrounding regions, so that they do not require the high sealing performance of the bore seal portions.

Accordingly, in this metal gasket, the bore seal portions for the bore hole-surrounding regions require a high sealing performance, so that they have to be manufactured out of a high-grade metal material but the outer circumferential seal portions sealing the regions other than the bore hole-surrounding regions to not require the high sealing performance of the bore seal portions, so that they need not use a high-grade metal material. Since an inexpensive metal material can be used for the outer circumferential seal portions, the gasket manufacturing cost can be reduced.

DESCRIPTION OF THE PREFERRED EMBODIMENT

An embodiment of the metal gasket according to the present invention will now be described with reference to the drawings.

Figure 1:
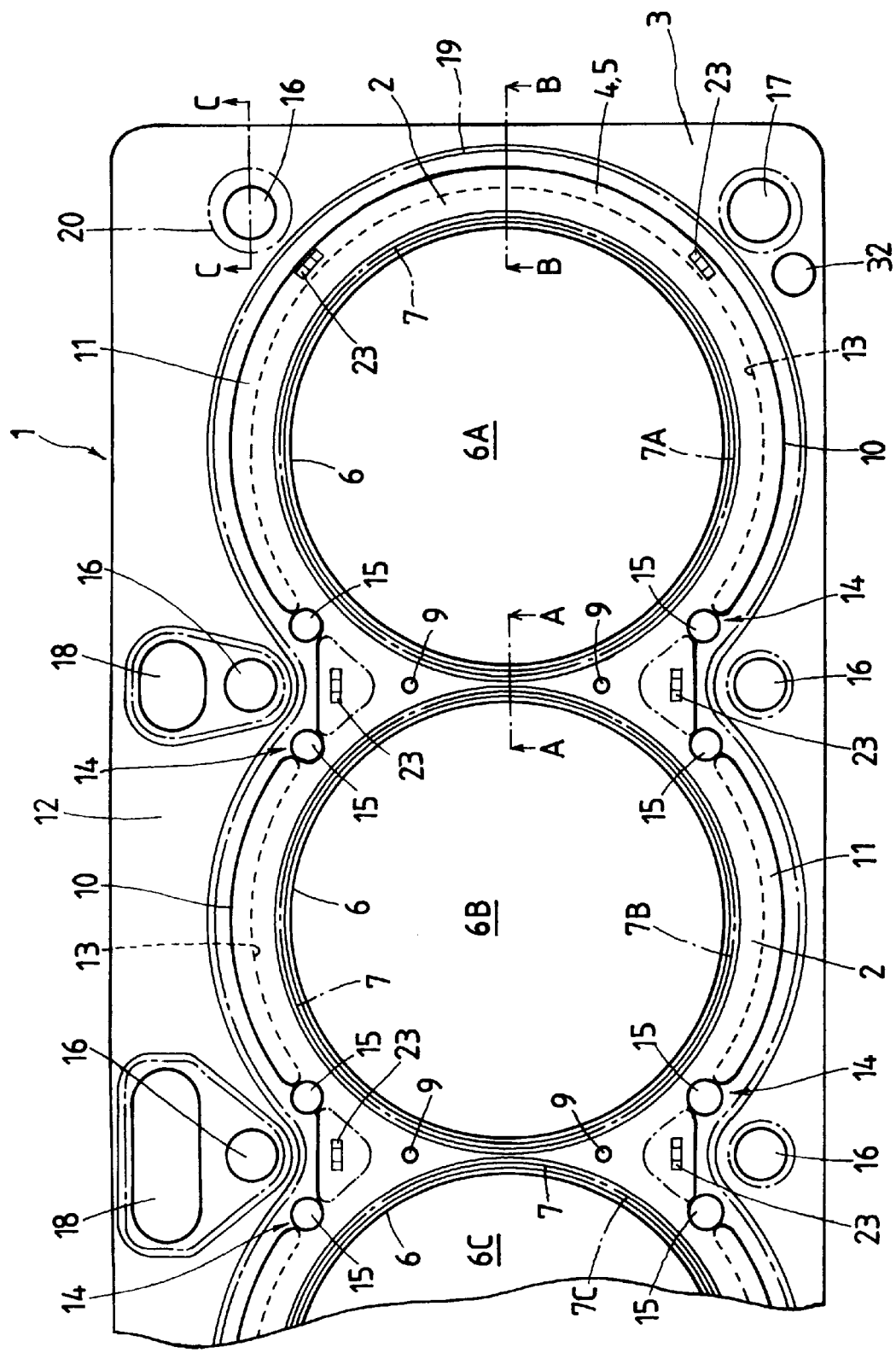
FIG. 1 is a plan view showing a part of an embodiment of the metal gasket according to the present invention.

As shown in FIG. 1, a metal gasket 1 is used to seal a clearance between the opposed fixing surfaces of a cylinder head and a cylinder block of a multicylinder engine. When the number of cylinders of a multicylinder engine increases or decreases, the metal gasket 1 may be formed so as to have a necessary number of bore holes in accordance with the increase or decrease of the cylinders. The metal gasket 1 can be formed to structures for being applied to, for example, 3-, 4- and 6-cylinder engines.

The metal gasket 1 comprises a pair of beaded inner metal plates 4, 5 formed of mutually laminated elastic metal plates for sealing bore seal portions 2, and an outer circumferential metal plate 12 provided on the outer circumferential side of the beaded metal plates 4, 5 so as to seal outer circumferential seal portions 3. The beaded metal plates 4, 5 are formed by punching metal materials, for example, stainless spring steel plates (or sheets), molding the resultant plates for the formation of beads thereon, and subjecting the beaded plates to a heat treatment and surface treatment, and these steel plates are formed out of a material wherein it satisfies predetermined levels of tensile strength, elongation and hardness. The outer circumferential metal plate 12 is produced from, for example, an electrogalvanized steel plate (or sheet).

The beaded metal plates 4, 5 are provided with bore holes 6A, 6B, 6C (generally designated by a reference numeral 6) parallel-arranged correspondingly to cylinder bores formed in the cylinders, i.e. a cylinder block of an engine and defined by the cylinder liners. The bore holes 6 of the beaded metal plates 4, 5 are formed in the corresponding positions to the same size. The beaded metal plate 5 as well as the beaded metal plate 4 has a symmetric structure with respect to the surface thereof at which it is laminated on the beaded metal plate 4. The bore seal portions 2 represent the regions extending along the bore holes 6 and including the regions between adjacent bore holes 6.

The beaded metal plate 4 is provided with beads 7A, 7B, 7C (generally designated by a reference numeral 7) extending along the circumferences of the bore holes 6, and the beaded plate 5 beads 8A, 8B, 8C (generally designated by a reference numeral 8) along the circumferences of the bore holes 6. The beaded plates 4, 5 are laminated on each other with the projecting portions of the beads 7, 8 opposed to each other in corresponding positions along the circumferences of the bore holes 6. The height and width of the beads 7, 8 can be changed in accordance with the circumferential positions thereof even in the regions around the same relative bore hole 6.

Figure 7:
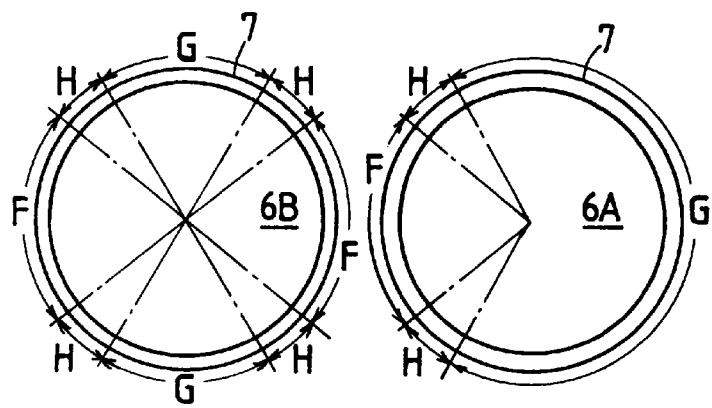
FIG. 7 is a schematic explanatory view showing the variation of the height of the beads around bore holes of the metal gasket of FIG. 1.
Figure 8:
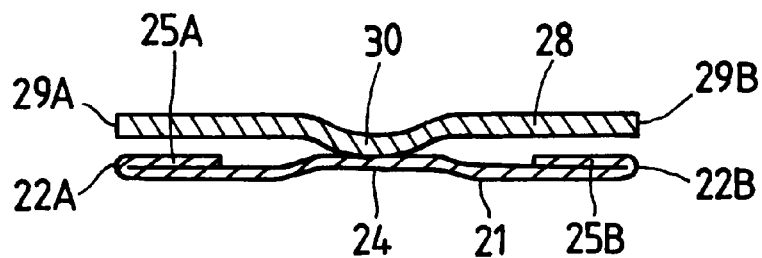
FIG. 8 is a sectional view of a region between adjacent bore holes of a conventional metal gasket.
Figure 9:
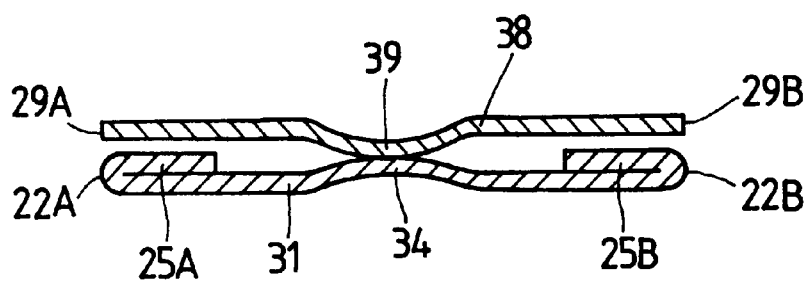
FIG. 9 is a sectional view of a region between adjacent bore holes of another conventional metal gasket.
Figure 10:
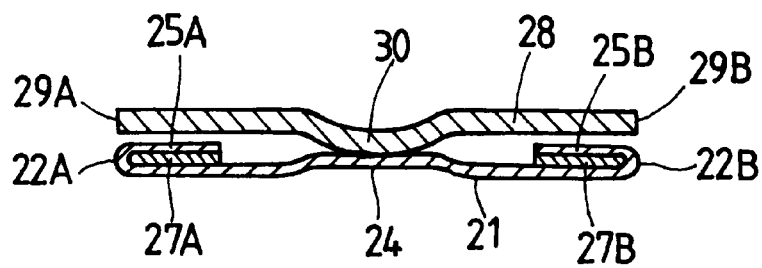
FIG. 10 is a sectional view of a region between adjacent bore holes of still another conventional metal gasket.

FIG. 7 shows an example of a bead the width of which is changed at different circumferential portions thereof around a bore hole 6. A region F between adjacent bore holes 6 is very narrow due to the miniaturization of an engine, so that the width of portions in the region F of two beads 7, 8 is set smaller than that of the portions thereof which are in a region G farthest away from adjacent bore holes 6. In transition regions between the regions F, G, the width of the beads increases gradually from the regions F toward the regions G. The height of the beads in the regions F can be set larger than that thereof in the regions G so as to obtain a larger sealing force, whereby the shape of the beads can be changed.

Figure 2:
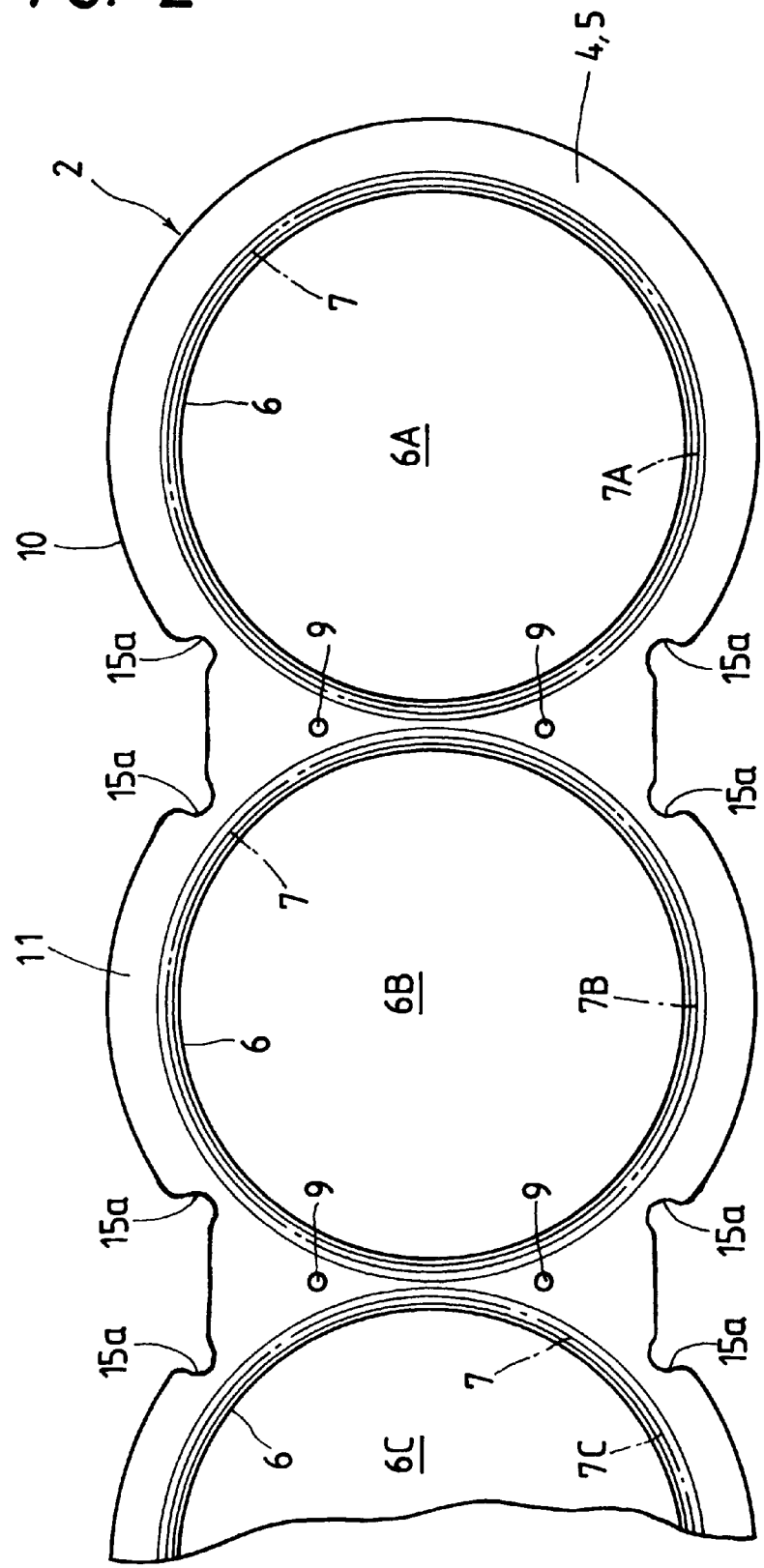
FIG. 2 is a plan view showing some of bore seal portions of the metal gasket of FIG. 1.

The beads 7, 8 are formed independently without making them meet each other in regions between adjacent bore holes 6. Accordingly, two beads 7, 8 exist on the portion of each of the beaded plates 4, 5 which is between adjacent bore holes 6. When the metal gasket 1 is held between the opposed fixing surfaces of a cylinder head and a cylinder block and tightened, the beads 7, 8 contact each other and are deformed. Referring to FIGS. 1 and 2, water holes 9 are formed in the regions in which the adjacent beads 7, 8 of the beaded metal plates 4, 5 extend close to each other.

Figure 3:
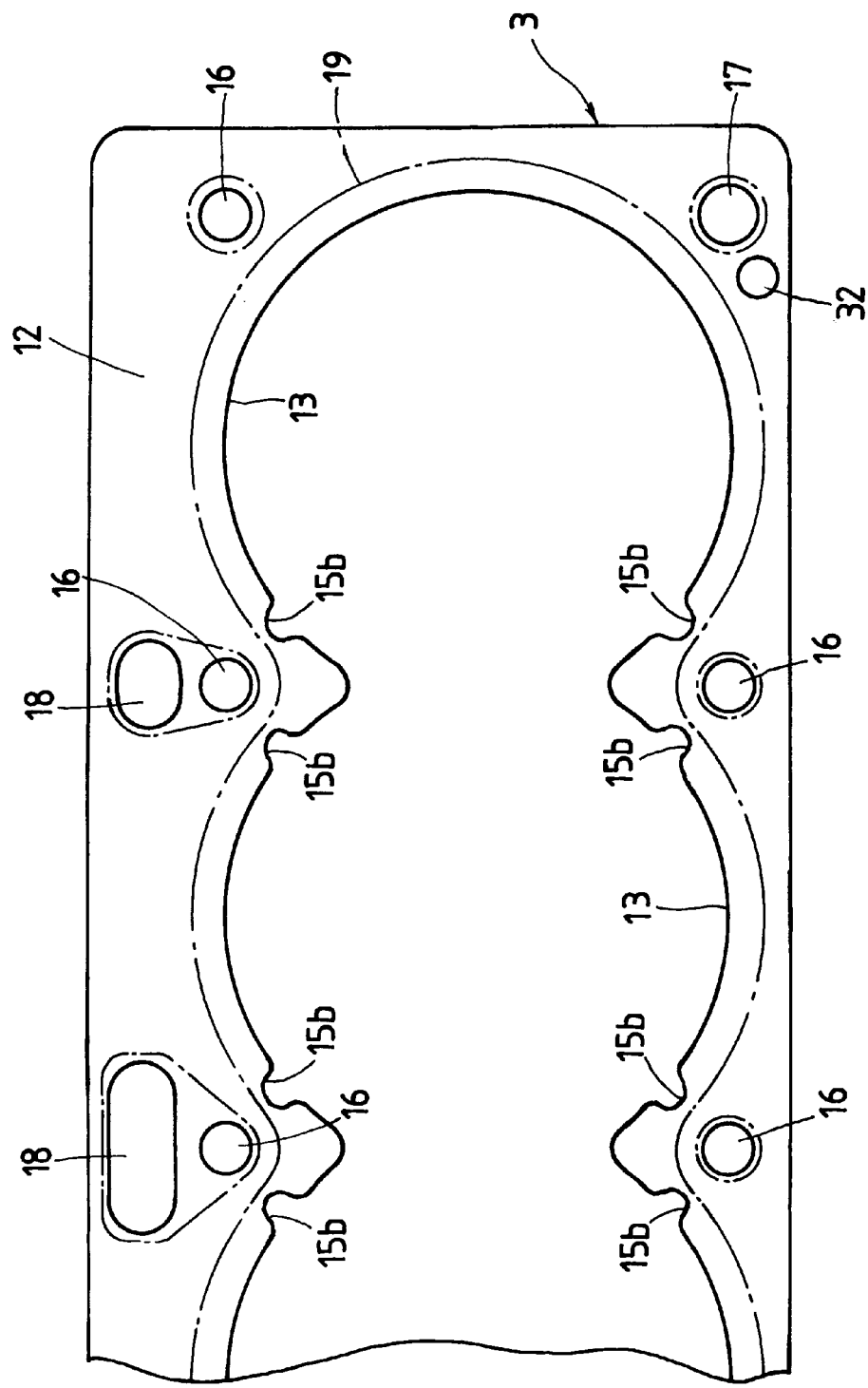
FIG. 3 is a plan view showing some of outer circumferential seal portions of the metal gasket of FIG. 1.

The sealing of the outer circumferential seal portions 3 is in charge of one outer circumferential metal plate 12 laminated on the beaded metal plates 4, 5 at circumferential portions 11 thereof having a comparatively small width and positioned on the inner side of the outer edges 10 of the beaded metal plates 4, 5. As shown in FIG. 3, the outer circumferential metal plate 12 comprising an elastic metal plate has an opening 13 the circumference of which extends along the circumferential portions 11 and projects inward over a small distance toward the centers of the bore holes 6. The opening 13 is formed as a single opening surrounding the bore seal portions 2 and bore holes 6 of the beaded metal plates 4, 5 wholly. The outer circumferential metal plate 12 is laminated on the beaded metal plates 4, 5 in the condition that the outer circumferential metal plate 12 is held between the beaded metal plates 4, 5 at their circumferential portions 11. In the regions between adjacent bore holes 6, the outer circumferential metal plate 12 is not laminated on the beaded metal plates 4, 5.

Figure 5:
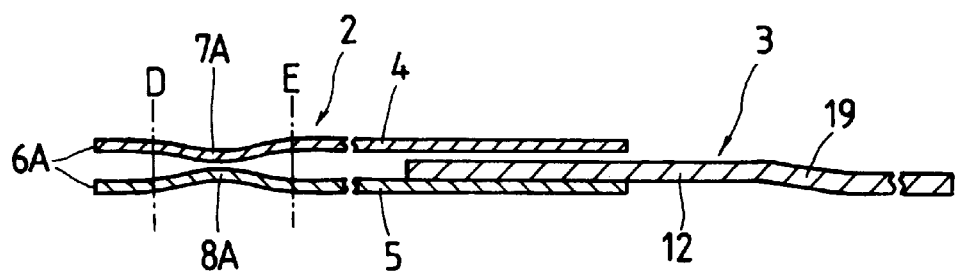
FIG. 5 is a sectional view of the metal gasket of FIG. 1 which is taken along the line B—B therein.

As shown in FIG. 5, the outer circumferential metal plate 12 forming the outer circumferential seal portions 3 is held between and combined with the beaded metal plates 4, 5 in the regions more distant from the positions of the bore holes 6 than from those of the beads 7, 8. The outer circumferential metal plate 12 is partially fixed to at least one of the beaded metal plates 4, 5 by laser welding, spot welding or mechanical caulking 23. This fixing operation may be carried out so that the beaded metal plates 4, 5 and outer circumferential metal plate 12 can be handled easily during operations for storing, transferring and assembling the metal gasket 1, and it is unnecessary that these metal plates 4, 5 and 12 be fixed together firmly.

In this embodiment, the circumferential portion 11, a laminating region forms a water jacket portion 14 of the metal gasket 1. The water jacket portion 14 includes parts where the beaded metal plates 4, 5 and outer circumferential metal plate 12 are not laminated, and a plurality of water holes 15 through which cooling water is passed are therefore formed around the bore holes 6. The water holes 15 are formed by semicircular recesses 15a provided in the beaded metal plates 4, 5 and those 15b provided in the outer circumferential metal plate 12. Although the water holes 15 shown in the drawing are circular, they are not limited to this shape. These holes 15 may comprise accurate elongated holes extending along the circumferences of the bore holes 6.

The outer circumferential metal plate 12 is provided with bolt holes 16, knock holes 17, blowby holes 18, and oil holes 32 through which an oil is passed. However, the provision of these holes relates to known techniques in the technical field of a metal gasket, so that detailed descriptions thereof are omitted.

Figure 6:
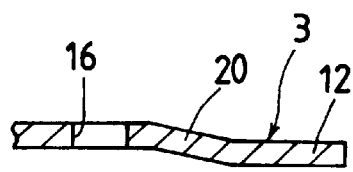
FIG. 6 is a sectional view of the metal gasket of FIG. 1 which is taken along the line C—C therein.

The outer circumferential metal plate 12 is provided with half beads 19 for sealing the whole circumference thereof. As shown in FIG. 6, similar half beads 20 are formed around, for example, the bolt holes 16 so as to seal the regions around the same holes.

Both the upper and lower surfaces of the metal gasket 1, i.e. at least one of the outer surfaces and opposed inner surfaces of the beaded metal plates 4, 5, and both surfaces of the outer circumferential metal plate 12 are covered (not shown) with a layer of coating of a thickness of, for example, about $10\mu$–$20\mu$ which is formed out of a non-metallic material, such as heat resisting and oil resisting rubber (for example, fluororubber) and resin. This enables a metal-to-metal contacting condition of the gasket with respect to a cylinder head and a cylinder block to be avoided, and the corrosion resistance, durability and strength of the metal gasket to be secured. Even when the mechanically processed surfaces of the beaded metal plates 4, 5 and outer circumferential metal plate 12 and mechanically processed opposed fixing surfaces of a cylinder head and a cylinder block have minute recesses and projections, they are covered with such a non-metallic material as mentioned above, and a sealing function of the plates can be fulfilled.

Let $t_1$, $t_2$ equal the thickness of the beaded metal plates 4, 5 respectively, and $t_3$ the thickness of the outer circumferential metal plate 12. These thicknesses have the relation of $t_1 < t_3$, $t_2 < t_3$ and $t_3 < t_1 + t_2$. Namely, the thicknesses $t_1$, $t_2$ of the beaded metal plates 4, 5 are smaller respectively than that $t_3$ of the outer circumferential plate 12 but a total thickness $(t_1 + t_2)$ of the beaded metal plates 4, 5 is set selectively so that it becomes larger than the thickness $t_3$ of the outer circumferential metal plate 12. Example of the thicknesses of the beaded metal plates 4, 5 and outer circumferential metal plate 12 are shown below. The $t_1$, $t_2$ are set selectively to 0.2 mm±0.03 mm, and $t_3$ 0.35 mm±0.05 mm. Desirably, the thickness of each plate is set selectively so that a value of $(t_1+t_2)-t_3$ becomes about 0.04–0.12 mm. When the thickness of each plate is set so that such plate thickness relation is established, the thickness of the bore seal portions 2 is necessarily set larger than that of the outer circumferential seal portions 3. Therefore, when the metal gasket is held between the opposed fixing surfaces and tightened, the surface pressure of the bore seal portions can be set higher than that of the outer circumferential seal portions 3.

The metal gasket 1 obtained by assembling the beaded metal plates 4, 5 and outer circumferential metal plate 12 together will now be described.

Figure 4:
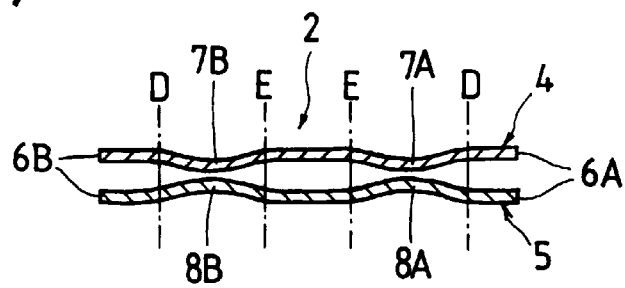
FIG. 4 is a sectional view of the metal gasket of FIG. 1 which is taken along the line A—A therein.

FIG. 4 is a sectional view of the portion of the metal gasket 1 which is between the bore holes 6A, 6B, taken along the line A—A, the regions between the other adjacent bore holes having the same sectional structures. The beads 7, 8 extend concentrically with and annularly around the circumferences of the relative bore holes 6. When the metal gasket is in a bolt-tightened condition, the surface pressure of the bore seal portions 2 becomes higher than that of the outer circumferential seal portions 3 in the bore-surrounding regions which require a high sealing force, so that a high sealing performance can be secured. In the bore seal portions 2, the beads 7, 8 of the beaded metal plates 4, 5 contact at the inner and outer edge portions D, E thereof the opposed fixing surfaces strongly to form seal lines. Consequently, a total of four seal lines are formed between adjacent bore holes, whereby the sealability of the metal gasket in the regions, in which a high-temperature combustion gas is liable to leak, between adjacent bore holes can be secured.

In the regions around the bore holes 6 which are other than the regions between adjacent bore holes 6, the leakage of a combustion gas is not so liable to occur as in the regions between adjacent bore holes, and a single bead body of the beads 7, 8 is formed. When the metal gasket is held between the opposed fixing surfaces and tightened, each of the beads 7, 8 contacts at the inner and outer edge portions D, E thereof the opposed fixing surfaces strongly to form two seal lines. The outer circumferential metal plate 12 is provided with half beads 19, 20 along the whole circumference thereof and around the bolt holes 16, knock holes 17, blowby holes 18 and oil holes 32. When the metal gasket is in a tightened state, the half beads 19, 20 are deformed, and the sealing performance is secured in the regions around the whole circumference and around each of these holes.

An embodiment of the metal gasket according to the present invention has been described but the present invention is not limited to this embodiment. For example, a cylinder head is taken up and described as an engine part to which this metal gasket is applied. This metal gasket can also be applied as a manifold gasket. The thickness of the beaded metal plates 4, 5 and the height, width and shape of the beads can be changed properly without maintaining them in the same condition in all cases, during the determination of the specifications of the metal gasket so that the irregularity occurring in the opposed fixing surfaces can be eliminated, the mentioned changing operations being carried out in accordance with the material and physical properties, such as the hardness of the opposed fixing surfaces of the engine parts, or the specifications of the engine. The portions of the beads which are between adjacent bore holes 6 of this metal gasket are formed independently but they may be formed so as to meet each other between adjacent bore holes as long as a required sealing performance can be secured. Water holes are taken up and described as holes other than the bore holes 6 and formed by the recesses provided in the circumferential portions of the beaded metal plates 4, 5 and the circumference of the opening of the outer circumferential metal plate 12 but such holes may comprise, for example, oil holes.

What is claimed is:

1. A metal gasket comprising an inner portion including juxtaposed combustion-chamber bore holes and an outer portion including non-bore outer holes, the outer portion including a central opening defined by an inner perimeter of the outer portion, the inner perimeter of the outer portion being complementary in configuration to an outer perimeter of the inner portion;

the inner portion comprising a pair of elastic metal plates further including a first inner plate and a second inner plate, the inner portion including bore beads extending around the bore holes for sealing around the bore holes;

the outer perimeter including a first outer perimeter of the first inner plate and a second outer perimeter of the second inner plate, the second outer perimeter confronting the first outer perimeter, the outer perimeter being configured substantially along the bore beads surrounding said bore holes;

the outer portion comprising a circumferential elastic metal outer plate including outer beads for sealing around the outer holes, the outer plate being sandwiched between the confronting first inner plate and second inner plate to define a narrow overlap area, the overlap area terminating a distance away from the bore beads on the inner plates wherein the bore beads of the first inner plate and the second inner plate confront each other such that raised surfaces of the respective bore beads are opposite one another; and wherein the outer plate is greater in thickness than either of the first inner plate or the second inner plate and is less in thickness than a sum of thicknesses of the first inner plate and the second inner plate.

2. The gasket according to claim 1, wherein the first inner plate and the second inner plate are equal in thickness.

3. The gasket according to claim 1, wherein the first inner plate and the second inner plate are unequal in thickness.

4. The gasket according to claim 1, wherein each of the bore beads is uniform in height throughout an entire circumference thereof.

5. The gasket according to claim 1, wherein each of the bore beads undulates in height throughout an entire circumference thereof.

6. The gasket according to claim 1, wherein the bore beads on the first inner plate and the second inner plate are formed as full beads.

7. The gasket according to claim 1, wherein one of the outer beads at areas surrounding the central opening of the outer plate is formed to develop a first half bead and the other of the outer beads at areas surrounding the outer holes is formed to develop a second half bead.

8. The gasket according to claim 1, wherein the bore beads surrounding two adjacent bore holes merge into a single bead in an Area between the adjacent bore holes.

9. The gasket according to claim 1, wherein the bore beads surrounding two adjacent bore holes merge are independent in an area between the adjacent bore holes.

10. The gasket according to claim 1, wherein the outer plate is fastened to at least one of the first inner plate and the second inner plate.

11. The gasket according to claim 1, wherein the inner perimeter of the outer plate includes first recesses, and the outer perimeter of the first inner plate and the outer perimeter of the second inner plate include second recesses, and wherein some of the holes other than the bore holes are formed by the first recesses and the second recesses being disposed oppositely.

12. The gasket according to claim 1, wherein the outer holes in the outer plate comprise bolt holes, water holes, oil holes, knock holes, and a blow-by holes.

13. The gasket according to claim 1, wherein the inner portion is formed of a high-grade metal and the outer portion is not.

14. The gasket according to claim 1, wherein the inner portion is formed of stainless spring steel sheet and the outer portion is formed of electrogalvanized steel sheet.

15. The gasket according to claim 1, wherein a width of the laminating region is comparatively small.

* * * * *